(No Model.)

J. BIRKENHEAD.
BORING TOOL.

No. 335,206. Patented Feb. 2, 1886.

Witnesses.
S. N. Piper
R. B. Torrey

Inventor,
John Birkenhead.
by R. H. Eddy, atty.

UNITED STATES PATENT OFFICE.

JOHN BIRKENHEAD, OF MANSFIELD, MASSACHUSETTS.

BORING-TOOL.

SPECIFICATION forming part of Letters Patent No. 335,206, dated February 2, 1886.

Application filed November 2, 1885. Serial No. 181,605. (No model.)

*To all whom it may concern:*

Be it known that I, JOHN BIRKENHEAD, of Mansfield, in the county of Bristol, of the Commonwealth of Massachusetts, have invented a new and useful Improvement in Tools for Boring and Reaming; and I do hereby declare the same to be described in the following specification, and represented in the accompanying drawings, of which—

Figure 1:
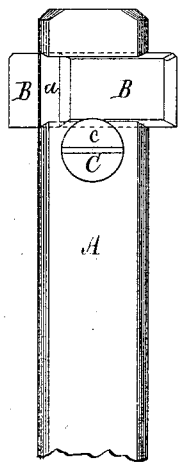
Figure 3:
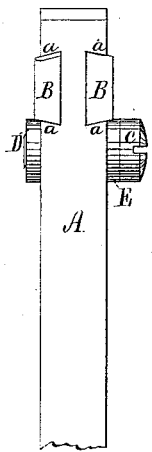
Figure 4:
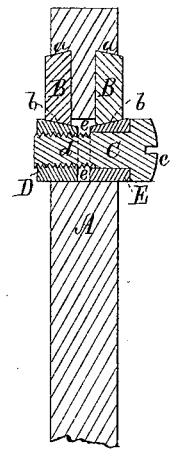
Figure 2:
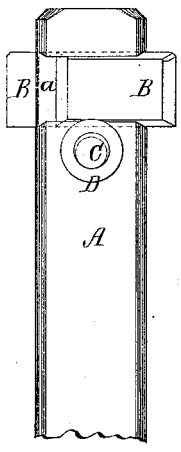
Figure 5:
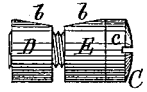
Figure 6:
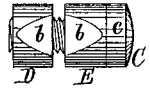
Figure 7:
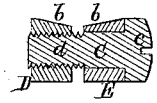

Figures 1 and 2 are opposite side views, Fig. 3 an edge view, and Fig. 4 a longitudinal and transverse section, of a reamer of my invention, the nature of which is defined in the claim hereinafter presented. Figs. 5 and 6 are side views, and Fig. 7 a longitudinal section, of the clamping-screw and the beveled nut and washer for securing the cutters to the stock of the tool.

In the said drawings, A denotes the said stock, which near one end of it has in each of its two opposite sides a dovetailed groove, *a*, that extends transversely across the said stock, one of such grooves being directly opposite the other, as represented. In each of the said grooves, and fitted to slide lengthwise therein, is a blade or cutter, B, whose opposite longer edges are beveled in correspondence with those of the groove.

For securing the two blades or cutters in the said grooves there are employed a clamping-screw, C, a beveled nut, D, and a correspondingly-beveled washer, E. Both nut and washer are short cylinders, each of which is beveled on one edge of it, as shown at *b*. The screw C has a nicked head, *c*, for receiving the end of the blade of a screw-driver, the shank *d* of the screw being screw-threaded extended through the washer and screwed into the nut, the washer having no screw-thread in its bore. There is bored through the stock transversely of it, and beside the two dovetailed grooves, so as to open into each of them, a cylindrical hole, *e*, having a diameter corresponding to that of the nut and equal to that of the washer. The nut and washer are inserted endwise in this hole, the washer being at one and the nut at the other end of it. The bevels of washer and nut are in contact with the next adjacent beveled edges of the cutters. The shank of the screw goes through the washer and screws into the nut, and on the screw being set up sufficiently the washer and nut will be strongly forced against the cutters, so as to clamp them in their positions in the stock.

From the above it will be seen that the cutters may be moved or adjusted lengthwise in their grooves, so as to carry the outer cutting-edges of such cutters to different distances, or such distances from the axis of the stock as circumstances may require, and after having been so adjusted they may be firmly fixed in place by means of the screw, nut, and washer.

I claim—

The combination of the stock A, provided with the hole *e* and the two dovetailed grooves *a* opening into it, as described, with the dovetailed blades or cutters B, arranged in such grooves, and with the screw C, the beveled nut D, and washer E, disposed within the said hole, and with respect to the cutters, as set forth, all being substantially as represented.

JOHN BIRKENHEAD.

Witnesses:
R. H. EDDY,
R. B. TORREY.